US012663517B2

(12) United States Patent (10) Patent No.: US 12,663,517 B2
Chhabra et al. (45) Date of Patent: Jun. 23, 2026

(54) ROTATIONAL, RECIPROCATING LIDAR SCANNING

(71) Applicant: Cepton Technologies, Inc., San Jose, CA (US)

(72) Inventors: Aman Chhabra, San Jose, CA (US); Jiawei Liu, San Jose, CA (US); Sergio Guevara, San Jose, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 588 days.

(21) Appl. No.: 18/138,302

(22) Filed: Apr. 24, 2023

(65) Prior Publication Data

US 2023/0341522 A1 Oct. 26, 2023

Related U.S. Application Data

(60) Provisional application No. 63/333,748, filed on Apr. 22, 2022.

(51) Int. Cl.
*G01S 7/481* (2006.01)
*G01S 7/48* (2006.01)
*G01S 17/894* (2020.01)

(52) U.S. Cl.
CPC .......... *G01S 7/4817* (2013.01); *G01S 7/4808* (2013.01); *G01S 7/4812* (2013.01); *G01S 7/4813* (2013.01); *G01S 17/894* (2020.01)

(58) Field of Classification Search
CPC .... G01S 7/4817; G01S 7/4808; G01S 7/4812; G01S 7/4813; G01S 17/894; G01S 7/4815; G01S 7/4816; G01S 17/10; G01S 17/36; G01S 17/42
See application file for complete search history.

(56) References Cited

U.S. PATENT DOCUMENTS

| | | | |
|---|---|---|---|
| 10,451,740 B2 | 10/2019 | Pei et al. | |
| 10,921,431 B2 | 2/2021 | Pei et al. | |
| 10,935,637 B2 | 3/2021 | Cullumber et al. | |
| 11,150,348 B2 | 10/2021 | Allen et al. | |
| 11,686,818 B2 | 6/2023 | McCord et al. | |
| 11,822,020 B2 | 11/2023 | Pei et al. | |
| 12,242,001 B2 | 3/2025 | McCord | |

(Continued)

FOREIGN PATENT DOCUMENTS

| | | | | |
|---|---|---|---|---|
| EP | 3521858 A2 * | 8/2019 | ............. | G01S 7/481 |
| EP | 3581959 A1 * | 12/2019 | .......... | G01S 7/4817 |

(Continued)

OTHER PUBLICATIONS

U.S. Appl. No. 18/138,293, Non-Final Office Action, Mailed on Feb. 13, 2026, 21 pages.

(Continued)

*Primary Examiner* — Michael Lee
(74) *Attorney, Agent, or Firm* — Kilpatrick Townsend & Stockton LLP

(57) ABSTRACT

Rotational, reciprocal scanning is used in a scanning LiDAR system. A laser is mounted to a platform. A first bar and a second bar couple the platform with a pivot mount. The pivot mount is coupled with a base. The platform is arranged to rotate about the pivot mount in an arc while the laser transmits light pulses into an environment.

20 Claims, 13 Drawing Sheets

1500

(56) References Cited

U.S. PATENT DOCUMENTS

| | | | |
|---|---|---|---|
| 12,313,784 B2 | 5/2025 | Liao et al. | |
| 2012/0236379 A1 | 9/2012 | Da Silva et al. | |
| 2014/0111812 A1* | 4/2014 | Baeg | G01S 17/87 |
| | | | 356/610 |
| 2016/0170202 A1 | 6/2016 | Yasuda | |
| 2018/0180722 A1 | 6/2018 | Pei et al. | |
| 2019/0120940 A1 | 4/2019 | Pei et al. | |
| 2019/0235082 A1* | 8/2019 | Gimpel | G01S 17/42 |
| 2019/0243023 A1* | 8/2019 | Steinkogler | G01S 7/4817 |
| 2020/0018835 A1 | 1/2020 | Pei et al. | |
| 2020/0241113 A1 | 7/2020 | Cullumber et al. | |
| 2020/0241399 A1 | 7/2020 | Wei et al. | |
| 2020/0243577 A1 | 7/2020 | Pei et al. | |
| 2020/0249467 A1 | 8/2020 | Grutzeck et al. | |
| 2021/0063763 A1 | 3/2021 | Wu et al. | |
| 2021/0103055 A1 | 4/2021 | Allen et al. | |
| 2021/0141094 A1* | 5/2021 | Russ | G08B 29/24 |
| 2021/0396990 A1 | 12/2021 | Bella | |
| 2022/0091236 A1 | 3/2022 | McCord | |
| 2022/0187593 A1 | 6/2022 | Townsend et al. | |
| 2023/0184588 A1 | 6/2023 | Lu et al. | |
| 2023/0341519 A1 | 10/2023 | Chhabra et al. | |
| 2023/0341521 A1 | 10/2023 | Chhabra et al. | |

FOREIGN PATENT DOCUMENTS

| | | | | |
|---|---|---|---|---|
| EP | 4116733 A1 * | 1/2023 | | G01S 17/89 |
| WO | 2022/046401 A1 | 3/2022 | | |

OTHER PUBLICATIONS

U.S. Appl. No. 18/138,297, Non-Final Office Action, Mailed On Feb. 20, 2026, 13 pages.

* cited by examiner

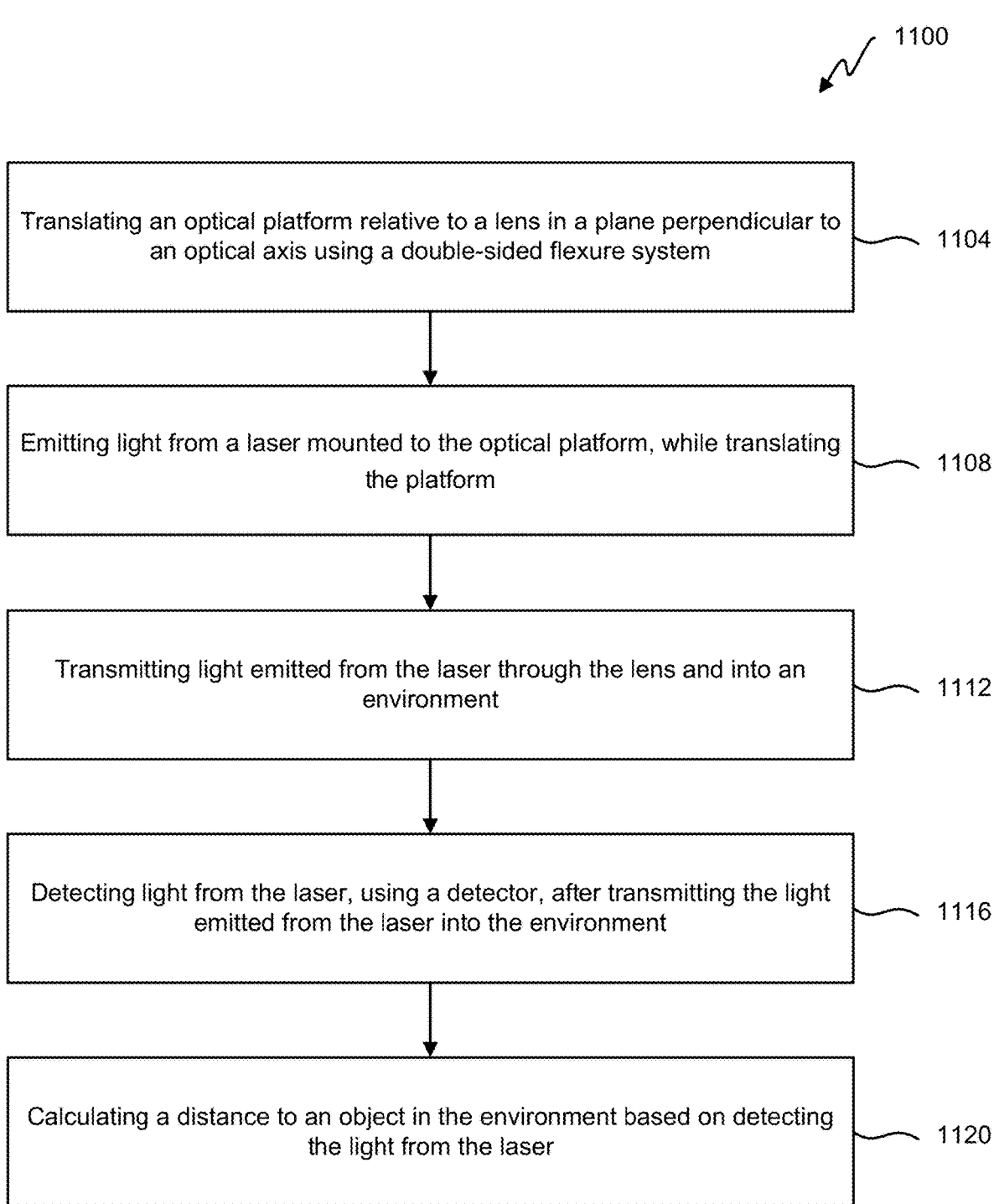

1100

Translating an optical platform relative to a lens in a plane perpendicular to an optical axis using a double-sided flexure system

1104

Emitting light from a laser mounted to the optical platform, while translating the platform

1108

Transmitting light emitted from the laser through the lens and into an environment

1112

Detecting light from the laser, using a detector, after transmitting the light emitted from the laser into the environment

1116

Calculating a distance to an object in the environment based on detecting the light from the laser

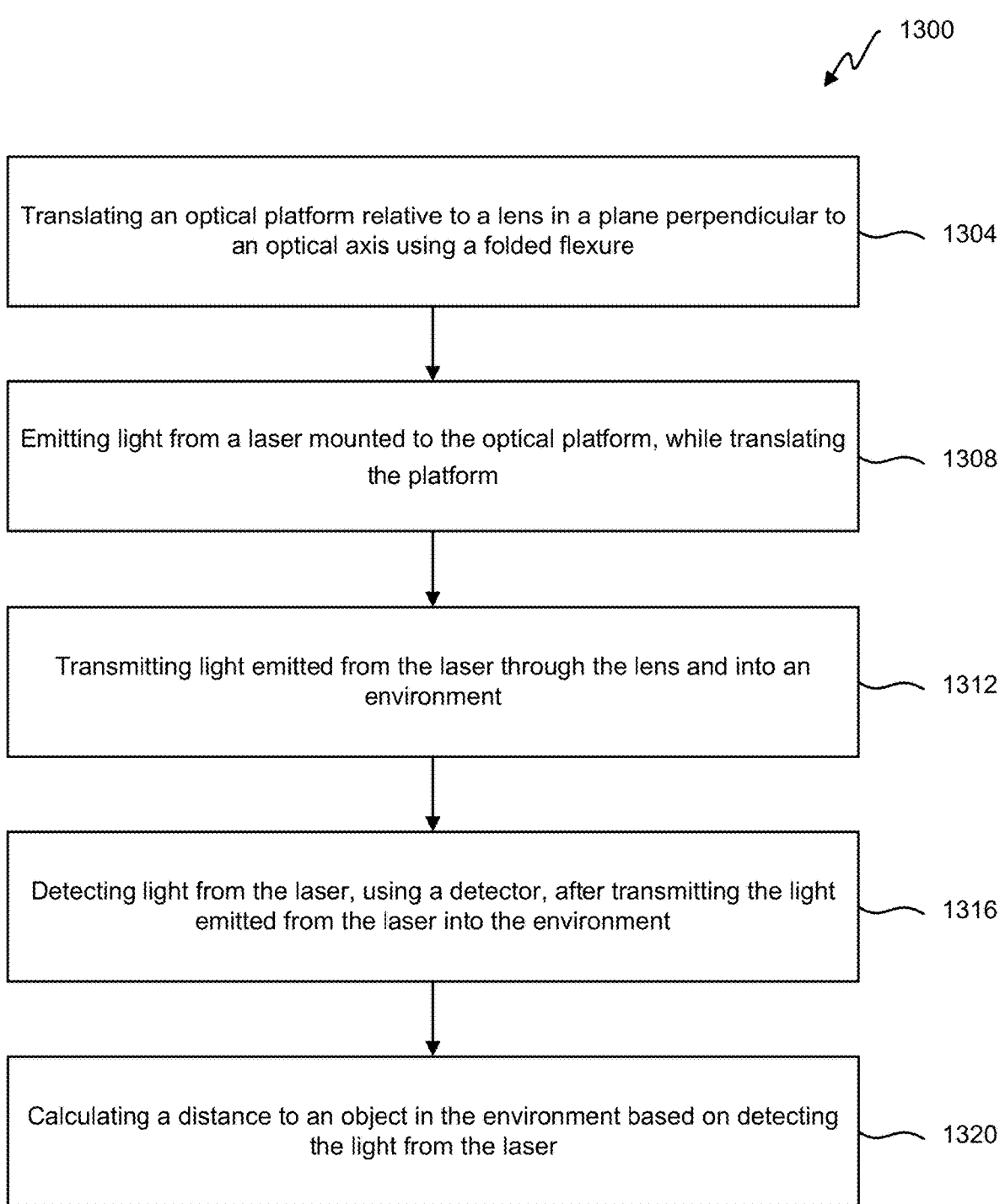

1300

Translating an optical platform relative to a lens in a plane perpendicular to an optical axis using a folded flexure     1304

Emitting light from a laser mounted to the optical platform, while translating the platform     1308

Transmitting light emitted from the laser through the lens and into an environment     1312

Detecting light from the laser, using a detector, after transmitting the light emitted from the laser into the environment     1316

Calculating a distance to an object in the environment based on detecting the light from the laser     1320

FIG. 13

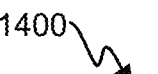
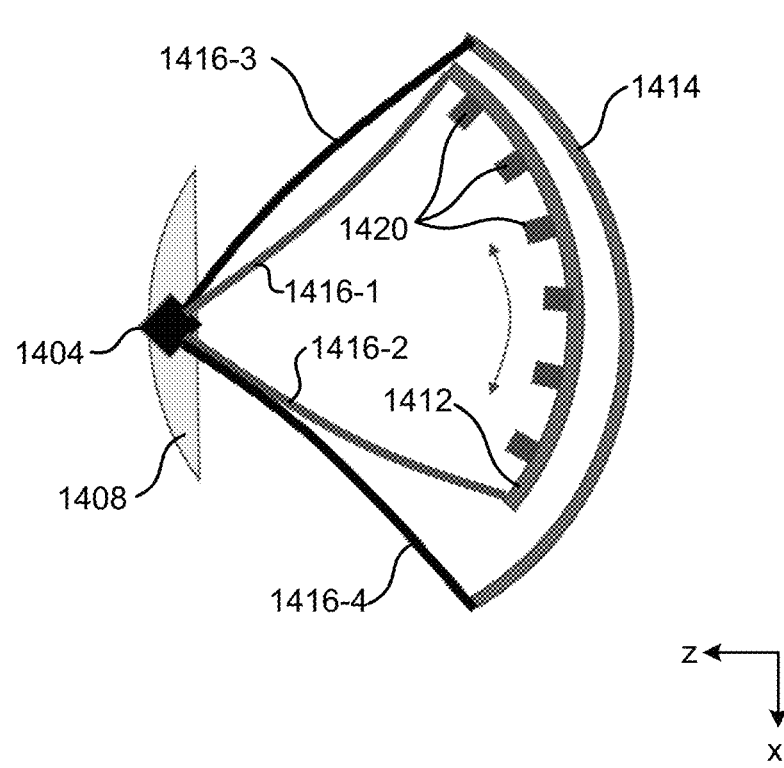
FIG. 14

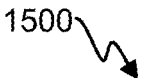
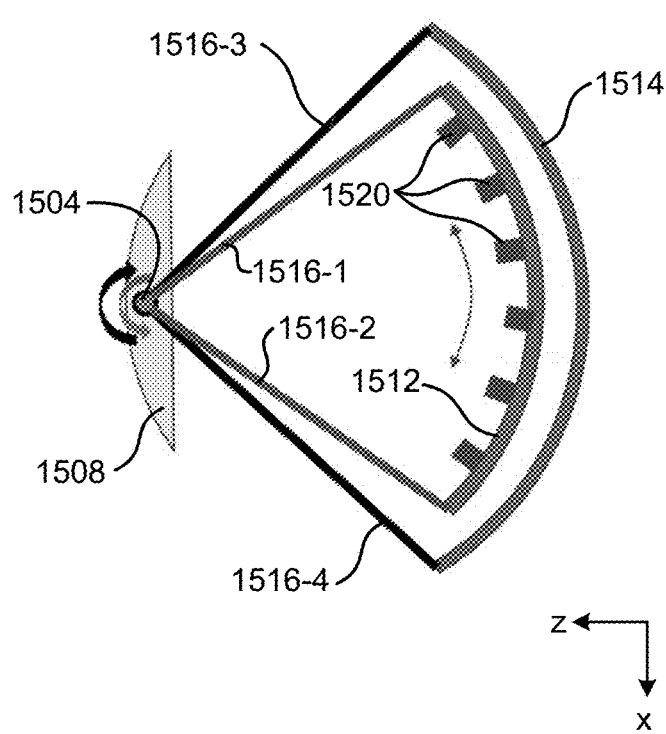
FIG. 15

ROTATIONAL, RECIPROCATING LIDAR SCANNING

CROSS-REFERENCES TO RELATED APPLICATIONS

This application claims the benefit of U.S. Provisional Patent Application No. 63/333,748, filed on Apr. 22, 2022, which is incorporated by reference in its entirety for all purposes.

The following three U.S. patent applications (including this one) are being filed concurrently, and the entire disclosure of the other applications are incorporated by reference into this application for all purposes:

application Ser. No. 18/138,293, filed Apr. 24, 2023, entitled "DOUBLE-SIDED FLEXURE FOR LINEAR LIDAR SCANNING";

application Ser. No. 18/138,297, filed Apr. 24, 2023, entitled "FOLDED FLEXURE FOR LINEAR LIDAR SCANNING"; and application Ser. No. 18/138,302, filed Apr. 24, 2023, entitled "ROTATIONAL, RECIPROCATING LIDAR SCANNING."

BACKGROUND

Three-dimensional (3D) sensors can be applied in various applications, including in autonomous or semi-autonomous vehicles, drones, robotics, security applications, and the like. LiDAR sensors are a type of 3D sensor that can achieve high angular resolutions appropriate for such applications. A LiDAR sensor can include one or more laser sources for emitting laser pulses and one or more detectors for detecting reflected laser pulses. A LiDAR sensor can measure the time it takes for each laser pulse to travel from the LiDAR sensor to an object within the sensor's field of view, then reflect off the object and return to the LiDAR sensor. The LiDAR sensor can calculate a distance how far away the object is from the LiDAR sensor based on the time of flight of the laser pulse. Some LiDAR sensors can calculate distance based a phase shift of light. By sending out laser pulses in different directions, the LiDAR sensor can build up a three-dimensional (3D) point cloud of one or more objects in an environment.

SUMMARY

In certain embodiments, a system for LiDAR comprises a platform having a first side and a second side opposite of the second side; an optical component mounted on the platform; a base; a first flexure; and/or a second flexure. The first flexure extends from a first mounting location to the platform; the first flexure is fixedly coupled with the base at the first mounting location; the first mounting location is closer to the first side of the platform than the second side; the second flexure extends from a second mounting location to the platform; the second flexure is fixedly coupled with the base at the second mounting location; and/or the second mounting location is closer to the second side of the platform than the first side. In some embodiments, the optical component is a laser, the laser is arranged to transmit light into an environment, and the system further comprises a detector arranged to detect light from the laser after light is transmitted from the laser into the environment. In some embodiments, one or more memory devices comprise instructions that, when executed, calculate a distance to an object in the environment based on detecting the light from the laser; the first flexure comprises a tapered arm; the tapered arm narrows in a direction toward the platform; a counterweight is coupled with the base; a lens is rigidly coupled with the base; the lens is characterized by a focal plane; the optical component is positioned on the focal plane of the lens; the first flexure and the second flexure are arranged to move the optical component in the focal plane of the lens; the first flexure comprises a first arm and a second arm; the first arm and the second arm are coupled with the platform; the first arm is coupled with the platform, and the second arm is coupled with the counterweight; the first flexure is separated from the second flexure at the platform by a gap; the first flexure and the second flexure are made of a same piece of material; the first flexure and the second flexure suspend the platform over the base, so that the base is below the platform; movement of the platform with respect to the base is characterized by a first resonant frequency in a first direction; the movement of the platform with respect to the base is characterized by a second resonant frequency in a second direction; the second direction is orthogonal to the first direction; the platform is centered between the first flexure and the second flexure; the optical component is mounted on the first side of the platform; the optical component is mounted on a third side of the platform; the third side is between the first side and the second side of the platform; the platform comprises a spar; and/or the first flexure and the second flexure are coupled with the spar.

In certain embodiments, a method for using a LiDAR system comprises translating a platform relative to a lens in a plane perpendicular to an optical axis of the lens; emitting light from the laser mounted on the platform, while translating the laser; transmitting light emitted from the laser through the lens and into an environment; detecting light from the laser, using a detector, after transmitting the light emitted from the laser into the environment; and/or calculating a distance to an object in the environment based on detecting the light from the laser. A first flexure extends from a first mounting location to the platform; the platform comprises a first side and a second side; the second side is opposite the first side; the first flexure is fixedly coupled with a base at the first mounting location; the first mounting location is closer to the first side of the platform than the second side; a second flexure extends from a second mounting location to the platform; the second flexure is fixedly coupled with the base at the second mounting location; and/or the second mounting location is closer to the second side of the platform than the first side. In some embodiments, the laser is translated in a focal plane of the lens; the lens is rigidly coupled with the base; the first flexure and the second flexure suspend the platform over the base, so that the base is below the platform; the platform is translated in a first direction at a first resonant frequency; the platform is in a second direction at a second resonant frequency; and/or the second direction is orthogonal to the first direction.

In certain embodiments, a system for LiDAR comprises a platform comprising a first side and a second side opposite the first side; an optical component mounted on the platform; a base; a lens coupled with the base, the lens characterized by a focal plane; and/or a flexure coupling the platform to the base. The base is closer to the second side than the first side; the flexure extends forward of first side to a fold in the flexure; and/or the flexure extends backward from the fold toward the base. In some embodiments, the optical component is a laser; the laser is arranged to transmit light into an environment; a detector is arranged to detect light from the laser after light is transmitted from the laser into the environment; one or more memory devices comprise instructions that, when executed, calculate a distance to an object in the environment based on detecting the light from the laser; the laser is mounted on the first side or the second side of the platform; the platform comprises a third side between the first side and the second side; the laser is mounted on the third side of the platform; the fold is a curvature of the flexure; the flexure couples a counterweight with the base; a distance from the base to the fold is equal to or less than four times a distance from the platform to the fold; the optical component is arranged to be halfway between the base and the fold; the lens comprising multiple sub lenses; the counterweight is arranged to move opposite of the platform during operation; the flexure comprises a first arm, a second arm, a third arm, and a fourth arm; the first arm and the second arm are coupled with the platform; and/or the third arm and the fourth arm are coupled with the counterweight.

In certain embodiments, a method for using a LiDAR system comprises translating a platform relative to a lens in a plane perpendicular to an optical axis of the lens; emitting light from a laser mounted on the platform, while translating the platform; transmitting light emitted from the laser through the lens and into an environment; detecting light from the laser, using a detector, after transmitting the light emitted from the laser into the environment; and/or calculating a distance to an object in the environment based on detecting the light from the laser. The platform comprises a first side and a second side opposite the first side; the platform is coupled to a base using a flexure; the base is closer to the second side than the first side; the flexure extends forward of first side to a fold in the flexure; and/or the flexure extends backward from the fold to the base. In some embodiments, the laser is mounted on the first side or the second side of the platform; the platform comprises a third side between the first side and the second side; the laser is mounted on the third side of the platform; the fold is a curvature of the flexure; and/or a counterweight is translated in opposition to motion of the platform.

In certain embodiments, a system for LiDAR comprises a base; a platform; an optical component mounted on the platform; a pivot mount coupled with the base; and/or a first bar and a second bar coupling the platform with the pivot mount, wherein the platform is arranged to rotate about the pivot mount. In some embodiments, the optical component is a laser; a lens is fixedly coupled with the base; the laser is arranged to emit light into an environment through the lens; a pivot mount coupling with base; a detector is arranged to detect light from the laser after light is transmitted from the laser into the environment; one or more memory devices comprises instructions that, when executed, calculate a distance to an object in the environment based on detecting the light from the laser; the detector is on the platform; the detector is one of a plurality of detectors; the lens is a single-element lens; the counterweight is curved; the pivot mount comprises a sliding bearing, a flexure bearing, or a torsion bar; the laser is part of a plurality of lasers; the plurality of lasers are mounted on the platform along a curve; the curve matches a field curvature of the lens; the pivot mount is at a center of the curve; the platform is curved; the platform is straight; the plurality of lasers are mounted on one or more interposers; the first bar and the second bar are arranged to flex; the pivot mount is fixed while scanning; the first bar and the second bar are rigid; the pivot mount is arranged to rotate during scanning; and/or the first bar and the second bar are arranged to flex in two dimensions during scanning.

In certain embodiments, a method for using a LiDAR system comprises rotating a platform about a pivot mount; emitting light from a laser mounted to the platform while rotating the platform; transmitting light emitted from the laser through a lens and into an environment; detecting light from the laser, using a detector, after transmitting the light emitted from the laser into the environment; and/or calculating a distance to an object in the environment based on detecting the light from the laser. The pivot mount is coupled with a base; the lens is fixedly coupled with the base; and/or a first bar and a second bar couple the platform with the pivot mount. In some embodiments, the first bar and the second bar are arranged to flex during scanning; the pivot mount is fixed during scanning; the first bar and the second bar are arranged to flex in one- or two-dimensions during scanning; and/or the detector is on the platform.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 2A depicts the system in a neutral position. FIG. 2B depicts the system in a flexed position.

FIG. 11 illustrates a flowchart of an embodiment of a process for scanning using a LiDAR sensor with a double-sided flexure.

FIG. 13 illustrates a flowchart of an embodiment of a process for scanning using a LiDAR sensor with a folded flexure.

FIG. 14 depicts a top view of an embodiment of a scanning LiDAR system with a fixed pivot mount.

FIG. 15 depicts a top view of an embodiment of a scanning LiDAR system with a rotating pivot mount.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
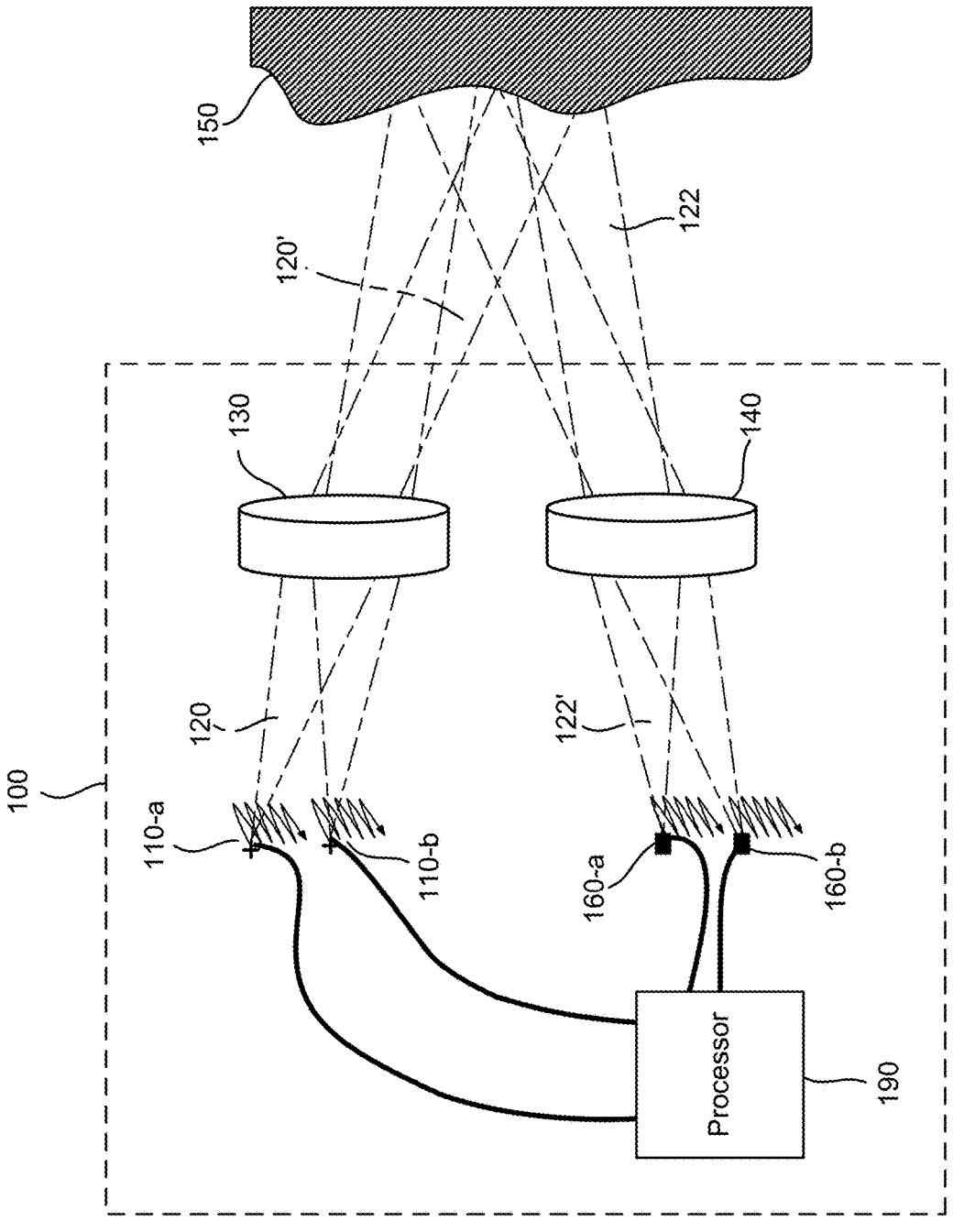
FIG. 1 illustrates an embodiment of a LiDAR sensor for three-dimensional imaging.

FIG. 1 illustrates an embodiment of a LiDAR sensor 100 for three-dimensional imaging. The LiDAR sensor 100 includes an emission lens 130 and a receiving lens 140. The LiDAR sensor 100 includes a light source 110-a disposed substantially in a back focal plane of the emission lens 130. The light source 110-a is operative to emit a light pulse 120 from a respective emission location in the back focal plane of the emission lens 130. The emission lens 130 is configured to collimate and direct the light pulse 120 toward an object 150 located in front of the LiDAR sensor 100. For a given emission location of the light source 110-a, the collimated light pulse 120' is directed at a corresponding angle toward the object 150.

A portion 122 of the collimated light pulse 120' is reflected off of the object 150 toward the receiving lens 140. The receiving lens 140 is configured to focus the portion 122' of the light pulse reflected off of the object 150 onto a corresponding detection location in the focal plane of the receiving lens 140. The LiDAR sensor 100 further includes a detector 160-a disposed substantially at the focal plane of the receiving lens 140. The detector 160-a is configured to receive and detect the portion 122' of the light pulse 120 reflected off of the object at the corresponding detection location. The corresponding detection location of the detector 160-a is optically conjugate with the respective emission location of the light source 110-a.

The light pulse 120 may be of a short duration, for example, 10 ns pulse width. The LiDAR sensor 100 further includes a processor 190 coupled to the light source 110-a and the detector 160-a. The processor 190 is configured to determine a time of flight (TOF) of the light pulse 120 from emission to detection. Since the light pulse 120 travels at the speed of light, a distance between the LiDAR sensor 100 and the object 150 may be determined based on the determined time of flight.

One way of scanning light pulses 120' across a FOV is to move the light source 110-a laterally relative to the emission lens 130 in the back focal plane of the emission lens 130. For example, the light source 110-a may be raster scanned to a plurality of emission locations in the back focal plane of the emission lens 130 as illustrated in FIG. 1. The light source 110-a may emit a plurality of light pulses at the plurality of emission locations. Each light pulse emitted at a respective emission location is collimated by the emission lens 130 and directed at a respective angle toward the object 150, and impinges at a corresponding point on the surface of the object 150. Thus, as the light source 110-a is raster scanned within a certain area in the back focal plane of the emission lens 130, a corresponding object area on the object 150 is scanned. The detector 160-a may be raster scanned to be positioned at a plurality of corresponding detection locations in the focal plane of the receiving lens 140, as illustrated in FIG. 1. The scanning of the detector 160-a is typically performed synchronously with the scanning of the light source 110-a, so that the detector 160-a and the light source 110-a are always optically conjugate with each other at any given time.

By determining the time of flight for each light pulse emitted at a respective emission location, the distance from the LiDAR sensor 100 to each corresponding point on the surface of the object 150 may be determined. In some embodiments, the processor 190 is coupled with a position encoder that detects the position of the light source 110-a at each emission location. Based on the emission location, the angle of the collimated light pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return light pulse 122' is measured and used to adjust the power of subsequent light pulses from the same emission point, in order to prevent saturation of the detector, improve eye-safety, or reduce overall power consumption. The power of the light pulse may be varied by varying the duration of the light pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the reflectivity, as determined by the intensity of the detected pulse, may also be used to add another dimension to the image. For example, the image may contain X, Y, and Z coordinates, as well as reflectivity (or brightness).

The angular field of view (AFOV) of the LiDAR sensor 100 may be estimated based on the scanning range of the light source 110-a and the focal length of the emission lens 130 as, $$AFOV = 2\tan^{-1}\left(\frac{h}{2f}\right),$$

where h is scan range of the light source 110-a along certain direction, and f is the focal length of the emission lens 130. For a given scan range h, shorter focal lengths would produce wider AFOVs. For a given focal length f, larger scan ranges would produce wider AFOVs. In some embodiments, the LiDAR sensor 100 may include multiple light sources disposed as an array at the back focal plane of the emission lens 130, so that a larger total AFOV may be achieved while keeping the scan range of each individual light source relatively small. Accordingly, the LiDAR sensor 100 may include multiple detectors disposed as an array at the focal plane of the receiving lens 140, each detector being conjugate with a respective light source. For example, the LiDAR sensor 100 may include a second light source 110-*b* and a second detector 160-*b*, as illustrated in FIG. 1. In other embodiments, the LiDAR sensor 100 may include four light sources and four detectors, or eight light sources and eight detectors. In one embodiment, the LiDAR sensor 100 may include eight light sources arranged as a 4×2 array and eight detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emission lens, the scan range of each light source, and the number of light sources.

The light source 110-*a* may be configured to emit light pulses in the near infrared wavelength ranges. The energy of each light pulse may be in the order of microjoules, which is normally considered to be eye-safe for repetition rates in the kHz range. For light sources operating in wavelengths greater than about 1500 nm (in the near infrared wavelength range), the energy levels could be higher as the eye does not focus at those wavelengths. The detector 160-*a* may comprise a silicon avalanche photodiode, a photomultiplier, a PIN diode, or other semiconductor sensors.

Additional LiDAR sensors are described in commonly owned U.S. patent application Ser. No. 15/267,558 filed Sep. 15, 2016, Ser. No. 15/971,548 filed on May 4, 2018, Ser. No. 16/504,989 filed on Jul. 8, 2019, Ser. No. 16/775,166 filed on Jan. 28, 2020, Ser. No. 17/032,526 filed on Sep. 25, 2020, Ser. No. 17/133,355 filed on Dec. 23, 2020, Ser. No. 17/205,792 filed on Mar. 18, 2021, and Ser. No. 17/380,872 filed on Jul. 20, 2021, the disclosures of which are incorporated by reference for all purposes.

In many types of optical imaging instruments, a high-speed mechanical motion is used to scan one or more light sources and/or detectors across a field of view. This is particularly the case when the number of detectors is less than the number of image pixels, so that the image is built up by scanning the one or more detectors over several image pixels. It may also be the case that the illumination system is unable to illuminate the entire field of view simultaneously, in which case the illumination source(s) is also scanned. The scanning may be a reciprocating motion (e.g., a back and forth motion), in some cases generating a 2-dimensional scan pattern such as a raster scan or a Lissajous pattern.

Scanning can be performed using a flexure to guide the scan motion. In some instances, the flexure is operated at a resonance frequency, which reduces or minimizes power constraints for the mechanical drive, which can be accomplished using a voice coil to drive the scan motion. The scanning may be performed in one or two dimensions orthogonal to an optical axis.

Some flexure designs are available but generally provide limited linear scan motion, particularly when the scan range is greater than 1% of the length of the flexure. Flexures can be made longer to provide a larger translation area (e.g., because deviation angle is less), but that results longer devices. It can be desirable, in some configurations, to have a larger linear translational area without simply making flexures longer.

Figures 2A, 2B:
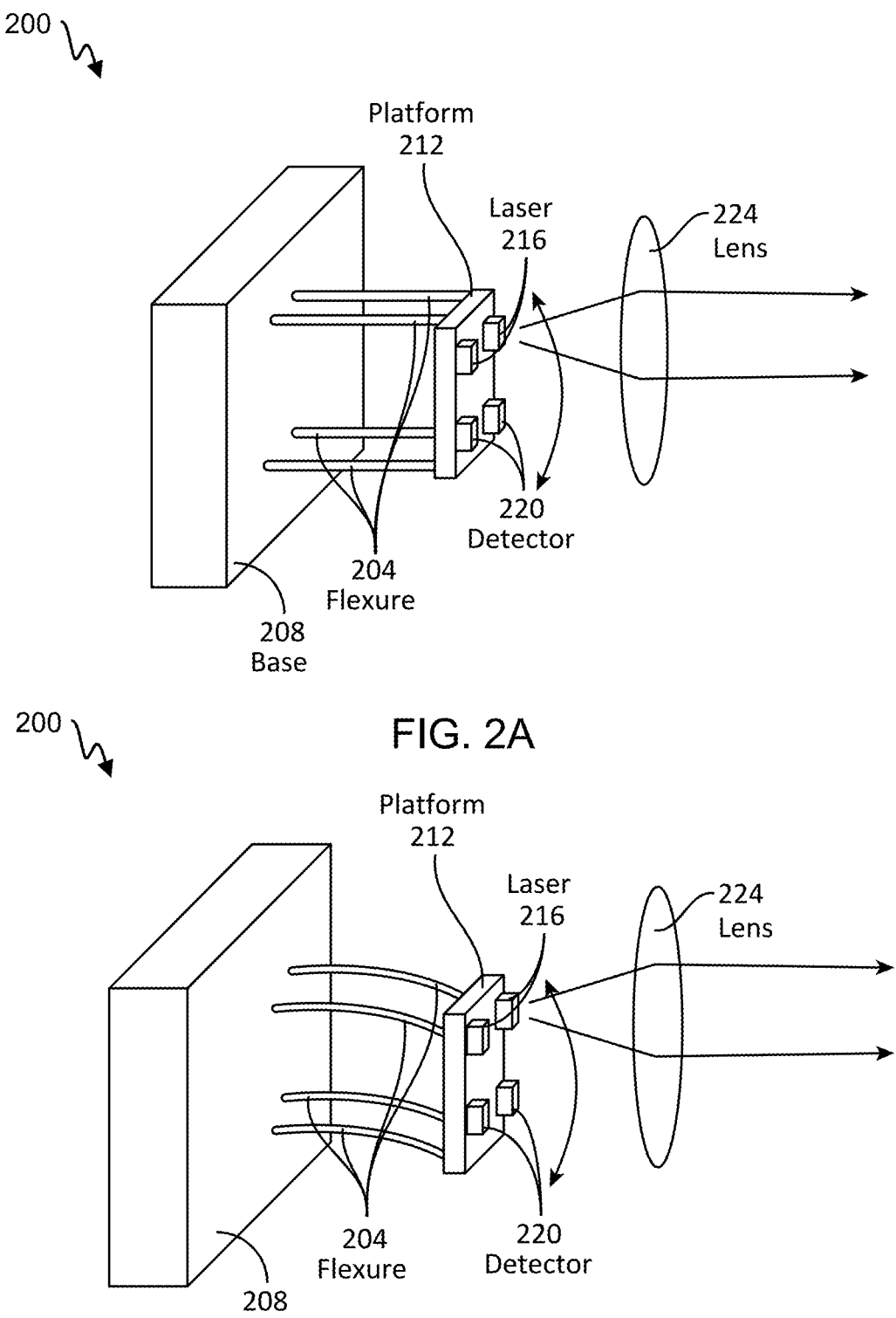
FIGS. 2A and 2B depict an embodiment of a scanning LiDAR system with flexures.

FIGS. 2A and 2B depict an embodiment of a scanning LiDAR system 200 with flexures 204. FIG. 2A depicts the scanning LiDAR system 200 in a neutral position. FIG. 2B depicts the scanning LiDAR system 200 moving downward. The platform 212 tends to move in an arc, rather than straight up and down, the farther the platform 212 moves downward from the neutral position. The flexures 204 extend from a base 208 to a platform 212. Lasers 216 and detectors 220 are mounted on the platform 212. The scanning LiDAR system 200 comprises a lens 224 (e.g., a collimating lens). The lasers 216 are arranged to transmit light into an environment (e.g., through the lens 224). The detectors 220 are arranged to detect light from the lasers 216 (e.g., through the lens 224 after light is transmitted from the laser 216 into the environment). One or more memory devices comprise instructions that, when executed, calculate a distance to an object in the environment based on detecting the light from the laser (e.g., based on time of flight and/or phase shift of light). Many light pulses can be emitted and detected to generate a three-dimensional map of at least a portion of the environment.

Arrows indicate how motion can deviate from a desired liner direction. The non-linear motion can have several undesirable effects. First, it can cause the platform 212 to go out of focus relative to the lens 224. Second, it can cause the scan direction or position of points along the scan to be non-ideal. Third, it can cause vibrations and acoustic noise with higher harmonics of the fundamental scan frequency, which can be difficult to cancel using methods such as a counterweight.

In some embodiments, improved flexure designs are applied to scanning optical instruments, such as LiDAR, to provide a mechanical scan or translation in one or two dimensions that is substantially linear over larger range of motion than the scanning LiDAR system shown in FIGS. 2A and 2B. This can help maintain proper focus across a larger scan motion and/or reduce generation of higher harmonic frequencies that can cause unwanted vibrations and/or acoustic noise. A larger linear scan motion can also help relax alignment tolerances.

Two embodiments are shown for linear motion: (I) LiDAR sensor with a double-sided flexure, and (II) LiDAR sensor with a folded flexure. A third embodiment, (III) LiDAR sensor with a pivot mount, for a rotational motion is also disclosed. The rotational motion can reduce or eliminate focus errors and/or higher harmonic generation from the scan motion; additionally, it can allow a simpler collimating lens design that mimics the operation of the human eye.

I. Double-Sided Flexure

Figure 3:
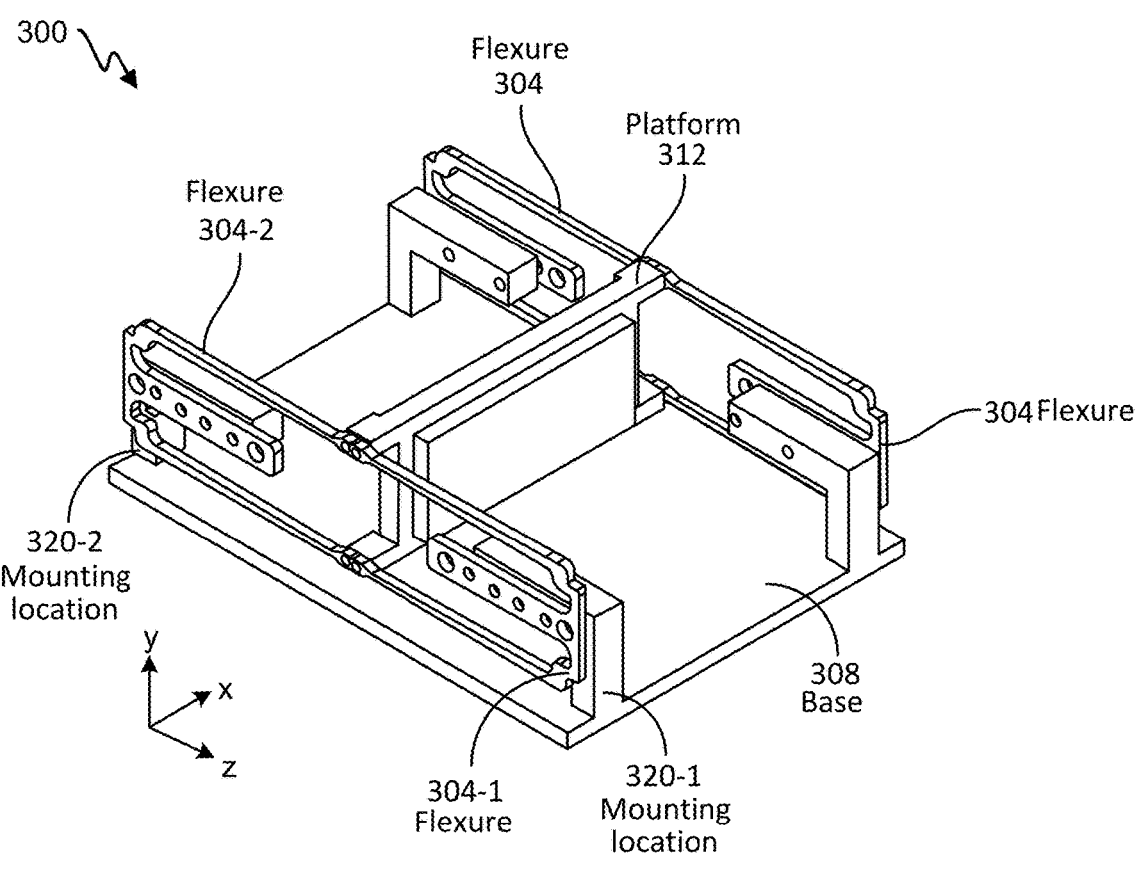
FIG. 3 depicts a perspective view of an embodiment of a scanning LiDAR system with double-sided flexures.
Figure 4:
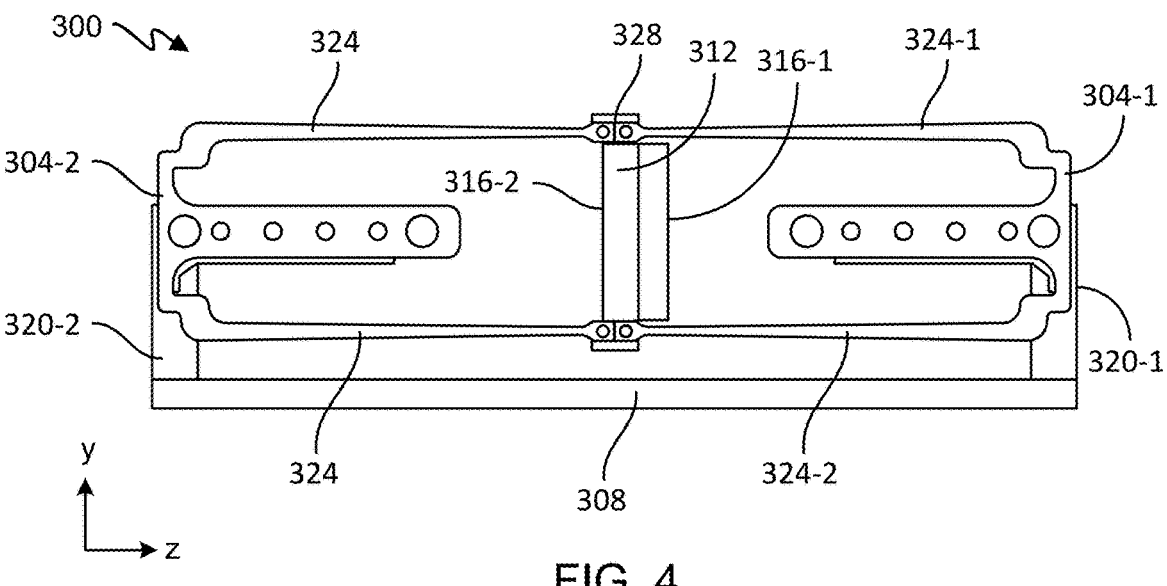
FIG. 4 depicts a side view of the embodiment of the scanning LiDAR system shown in FIG. 3.

FIG. 3 depicts a perspective view of an embodiment of a scanning LiDAR system 300 with double-sided flexures. FIG. 4 depicts a side view of the embodiment of the scanning LiDAR system 300 shown in FIG. 3. The scanning LiDAR system 300 comprises a first flexure 304-1, a second flexure 304-2, a base 308, and a platform 312. One or more optical components are mounted on the platform 312. For example, a laser (e.g., a laser similar to the laser 216 in FIGS. 2A and 2B) is mounted to the platform 312. The laser arranged to transmit light into an environment.

The platform comprises a first side 316-1 and a second side 316-2. The first side 316-1 is opposite of the second side 316-2 (e.g., the first side 316-1 has an outward facing normal that is parallel and opposite to an outward facing normal of the second side 316-2). In some embodiments, the outward facing normal of the first side 316-1 is a forward direction (e.g., opto-electric components are on the first side 316-1).

The first flexure 304-1 extends from a first mounting location 320-1 to the platform 312. The first flexure 304-1 is fixedly coupled with the base 308 at the first mounting location 320-1. The first mounting location 320-1 is closer to the first side 316-1 of the platform 312 than the second side 316-2.

The second flexure 304-2 extends from a second mounting location 320-2 to the platform 312. The second flexure 304-2 is fixedly coupled with the base 308 at the second mounting location 320-2. The second mounting location 320-2 is closer to the second side 316-2 of the platform 312 than the first side 316-1.

The platform 312 is symmetrically connected to flexures 304 on both the front (e.g., the first side 316-1) and back side (e.g., second side 316-2). The flexures 304 move, or translate, the platform 312 in a substantially linear fashion (e.g., in a plane perpendicular to an optical axis of the scanning LiDAR system 300; in the x/y plane). The platform 312 in FIG. 3 has a larger linear motion than the platform 212 in FIGS. 2A and 2B.

For sake of clarity, laser(s), detector(s), and lens(es) are omitted from this and other views, but could be positioned on and in front of the platform in a manner (e.g., similar to FIG. 2). For example, a laser can be arranged (e.g., positioned on the platform 312) to transmit light into an environment; a detector can be arranged (e.g., positioned on the platform 312) to detect light from the laser, after light is transmitted from the laser into the environment; one or more memory devices can comprise instructions that, when executed, calculate a distance to an object in the environment based on detecting the light from the laser; a lens can be rigidly coupled with the base; the lens can be characterized by a focal plane; the laser(s) and detectors(s) can be positioned on the focal plane of the lens; and/or the flexures 304 are arranged to move the optical component in the focal plane of the lens.

Figure 5:
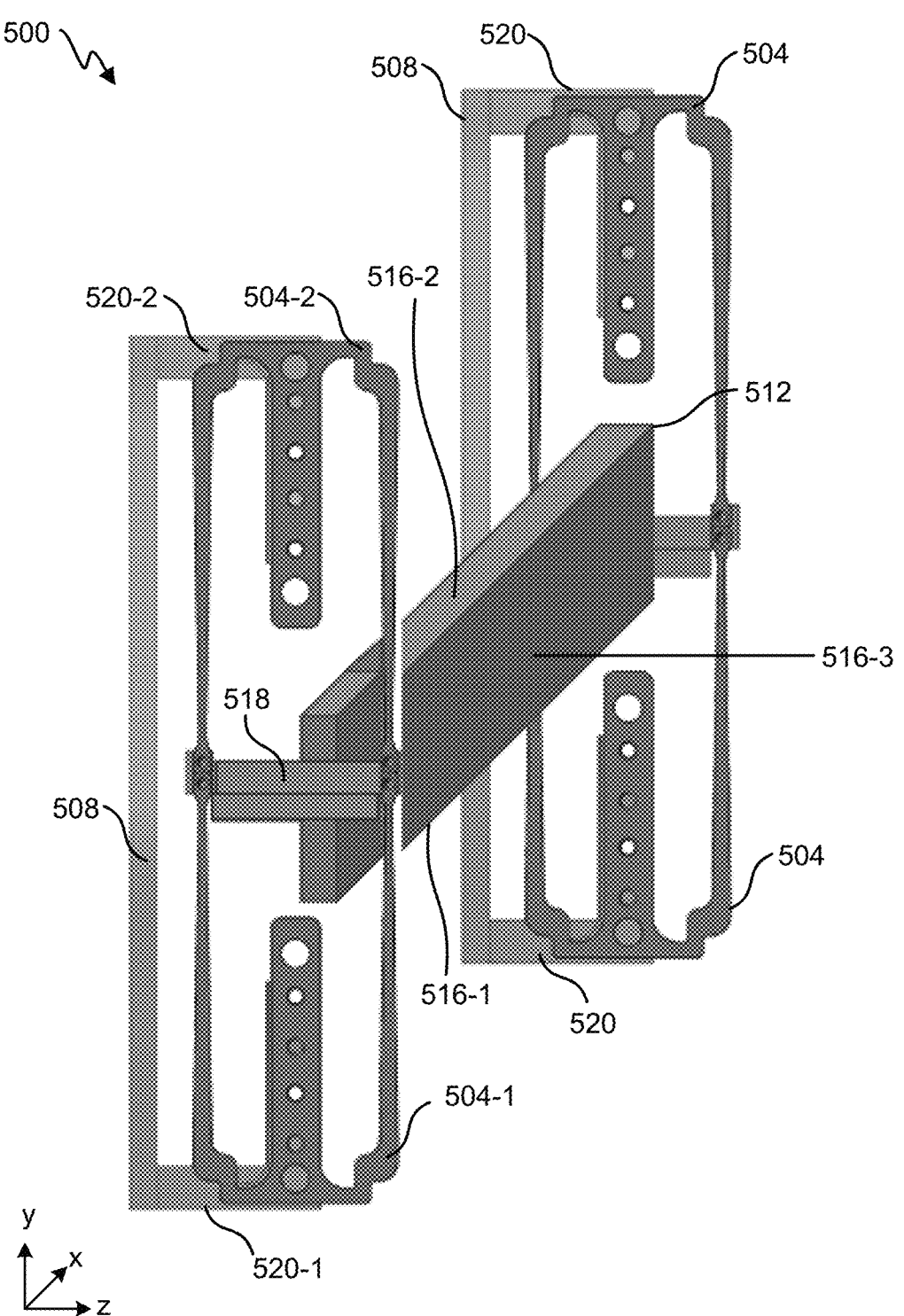
FIG. 5 depicts a perspective view of another embodiment of a scanning LiDAR system with double-sided flexures.

Other symmetrical arrangements of flexures with alternative geometric positioning (e.g., extending out from the sides, or extending vertically) could provide similar function and/or performance (e.g., see FIG. 5).

As shown in FIG. 4, the first flexure 304-1 and the second flexure 304-2 suspend the platform 312 over the base 308, so that the base 308 is below the platform 312. The first flexure 304-1 comprises a first arm 324-1 and a second arm 324-2. The first arm 324-1 and the second arm 324-2 are coupled with the platform 312. The arms 324 are tapered more narrowly in a direction (e.g., in the z dimension) from the first mounting location 320-1 toward the platform 312. The arms 324 taper in both a horizontal dimension (e.g., in the x dimension) and a vertical dimension (e.g., in the y dimension), though in some embodiments the arm 324 tapers in only one dimension or does not taper in either dimension.

The first flexure 304-1 is separated from the second flexure 304-2 at the platform 312 by a gap 328. In some embodiments, the first flexure 304-1 and the second flexure 304-2 are made of a same piece of material (e.g., extending from the first mounting location 320-1 to the second mounting location 320-2 without any breaks or gaps). In some embodiments, the first flexure 304-1 and the second flexure 304-2 are butted together with no gap. In some embodiments, the first flexure 304-1 is secured to the second flexure 304-2 (e.g., welded or bonded with an adhesive).

The flexures 304 provide a larger linear translation area for the platform 312 than flexures 204 in FIG. 2A, if a length of the flexure 204 were equal to twice the length of the first arm 324-1 of the first flexure 304-1.

FIG. 5 depicts a perspective view of another embodiment of a scanning LiDAR system 500 with double-sided flexures. The LiDAR system comprises a first flexure 504-1, a second flexure 504-2, a base 508, and a platform 512. The platform 512 comprises a first side 516-1, a second side 516-2, a third side 516-3, and a spar 518. The first side 516-1 is opposite the second side 516-2. The third side 516-3 is between the first side 516-1 and the second side 516-2 (e.g., the third side 516-3 has an outward facing normal that is orthogonal to an outward facing normal of the first side 516-1 and/or the second side 516-2). Optical components are mounted to the third side 516-3 of the platform 512.

The first flexure 504-1 extends from a first mounting location 520-1 to the platform 512. The first flexure 504-1 is fixedly coupled with the base 508 at the first mounting location 520-1. The first mounting location 520-1 is closer to the first side 516-1 of the platform 512 than the second side 516-2.

The second flexure 504-2 extends from a second mounting location 520-2 to the platform 512. The second flexure 504-2 is fixedly coupled with the base 508 at the second mounting location 520-2. The second mounting location 520-2 is closer to the second side 516-2 of the platform 512 than the first side 516-1.

The first flexure 504-1 and the second flexure 504-2 are coupled with the spar 518 of the platform 512. The spar 518 is an elongate bar or rod. The platform 512 is rotated 90 degrees with respect to the flexures 504 as compared to the platform 312 in FIG. 3. This can make the scanning LiDAR system 500 more compact in the z dimension as compared to the scanning LiDAR system 300. In some embodiments, the platform 512 in the scanning LiDAR system 500 scans in only one dimension (e.g., in the x dimension).

Figure 6:
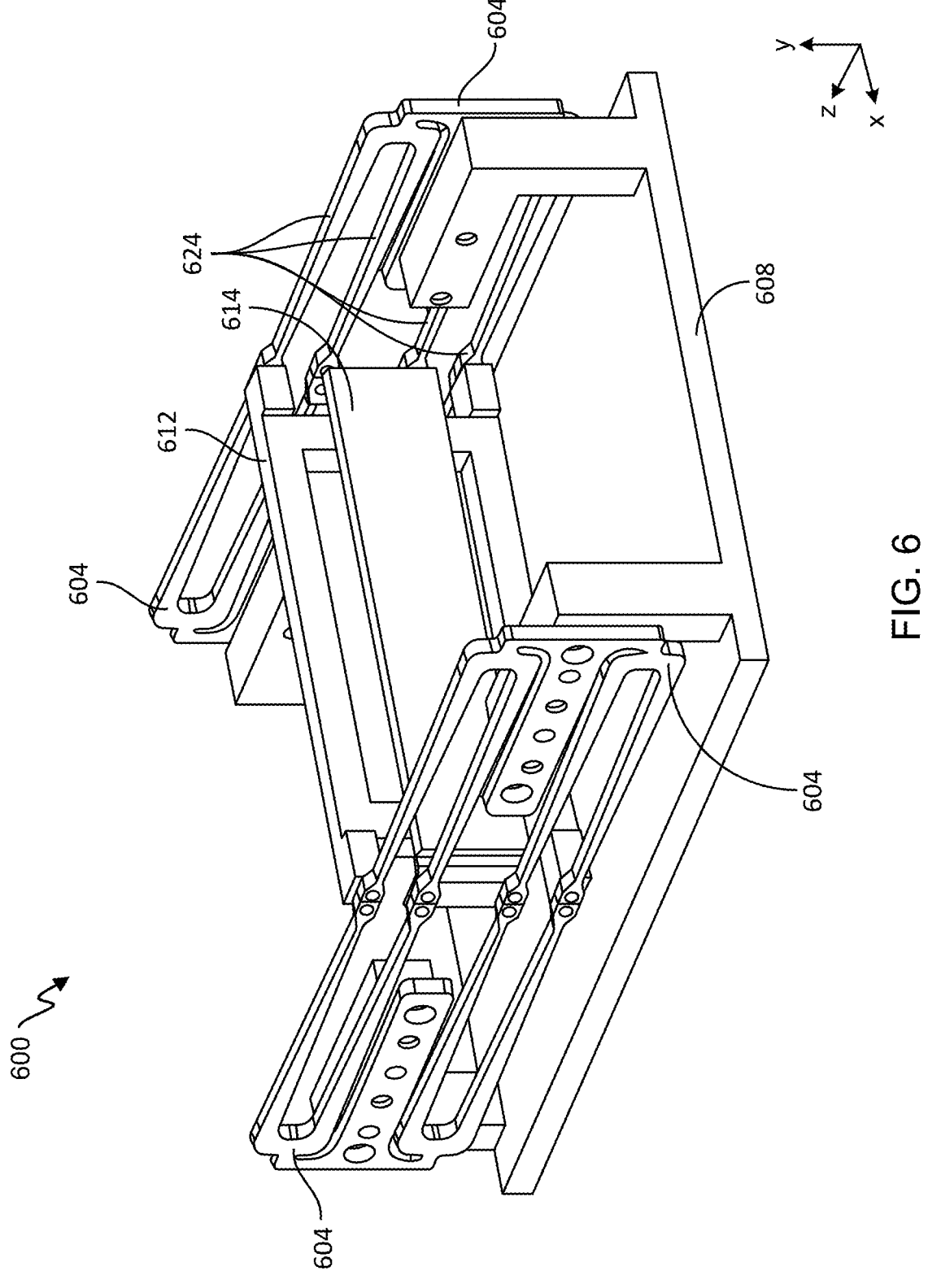
FIG. 6 depicts a perspective view of an embodiment of a scanning LiDAR system with double-sided flexures and a counterweight.

FIG. 6 depicts a perspective view of an embodiment of a scanning LiDAR system 600 comprising double-sided flexures (e.g., flexures 604), a base 608, a platform 612, and a counterweight 614. The counterweight 614 can reduce or cancel vibrations caused by the motion of the platform 612. The counterweight 614 is coupled with the base 608. The flexures 604 have four arms 624; two arms 624 are coupled with the platform 612 and two arms 624 are coupled with the counterweight 614. Momentum of the counterweight 614 can reduce or substantially cancel momentum of the platform 612.

Figures 7, 8:
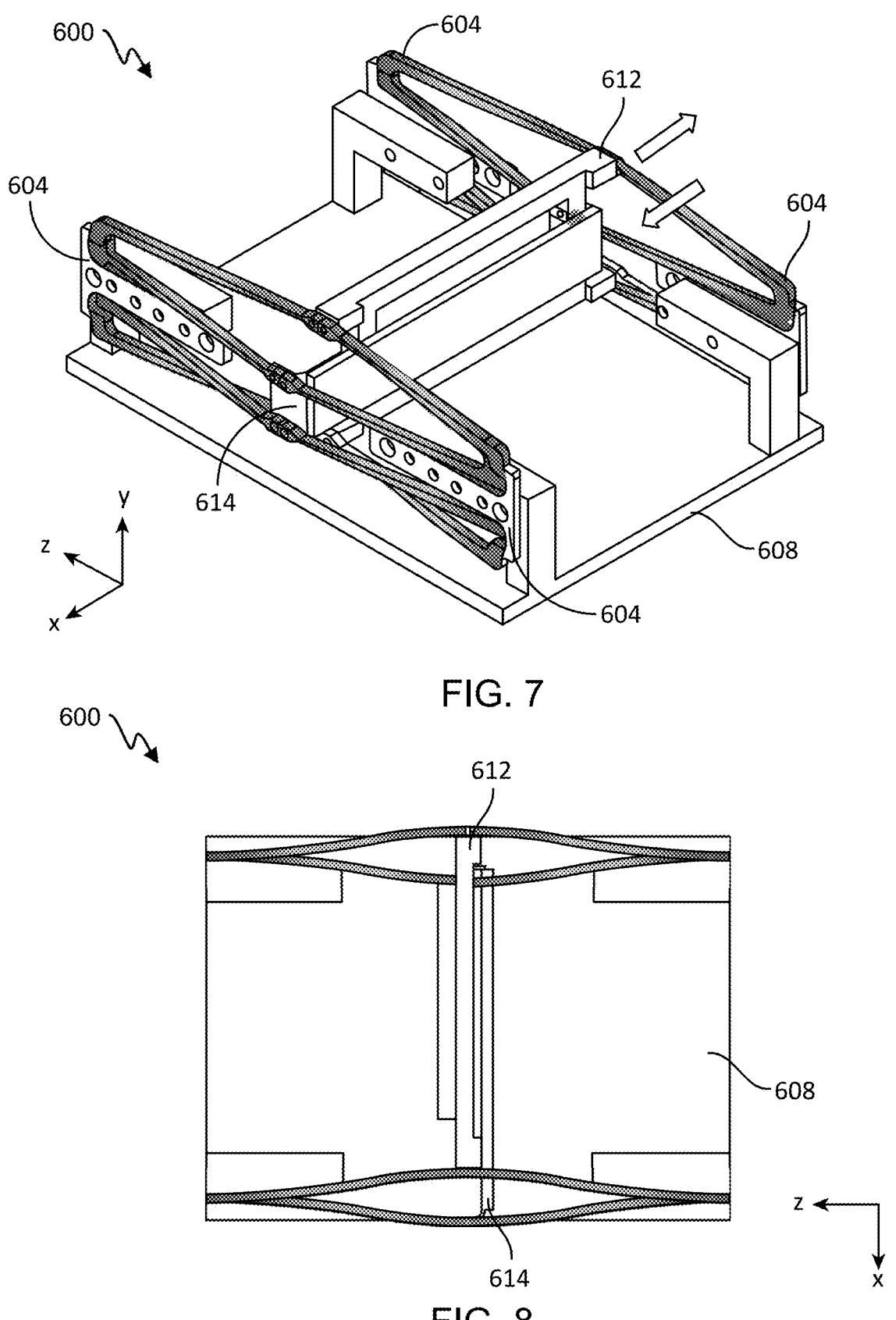
FIG. 7 depicts a perspective view of translation of an embodiment of a scanning LiDAR system in the horizontal dimension.
FIG. 8 depicts a top view of translation of the scanning LiDAR system shown in FIG. 7.

FIG. 7 depicts a perspective view of translation of an embodiment of the scanning LiDAR system 600 in the horizontal dimension. In FIG. 7, the counterweight 614 is extended horizontally (e.g., in the x direction), and the platform 612 is extended horizontally in the opposite direction (e.g., in the negative x direction).

FIG. 8 depicts a top view of translation of the scanning LiDAR system 600 shown in FIG. 7. The counterweight 614 is extended in the x direction, and the platform 612 is extended the negative x direction.

Figure 9:
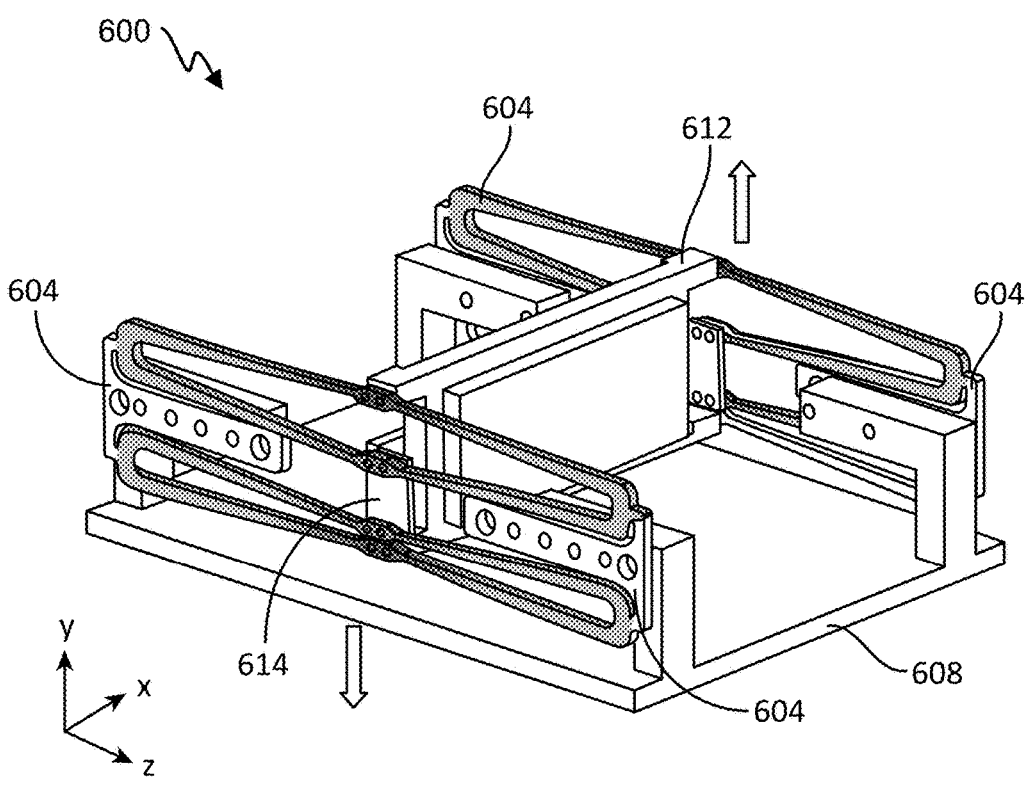
FIG. 9 depicts a perspective view of translation of an embodiment of a scanning LiDAR system in the vertical dimension.
Figure 10:
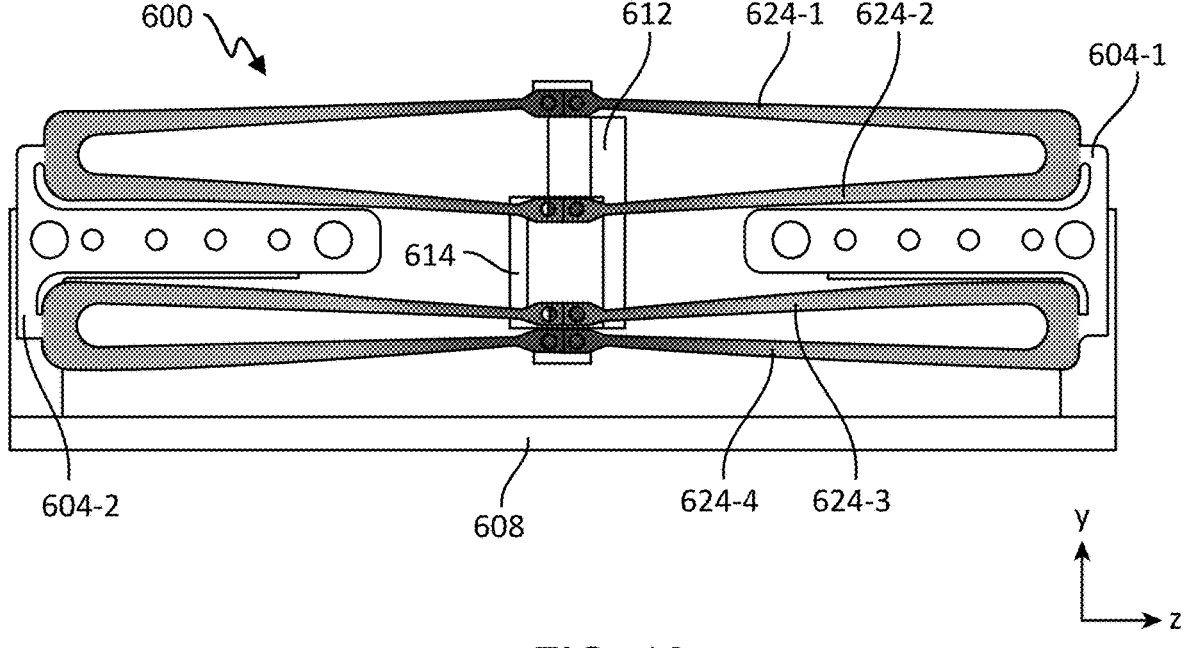
FIG. 10 depicts a side view of translation of the scanning LiDAR system shown in FIG. 9.

FIG. 9 depicts a perspective view of translation of an embodiment of a scanning LiDAR system 600 in the vertical dimension (i.e., in the y dimension). FIG. 10 depicts a side view of translation of the scanning LiDAR system 600 shown in FIG. 9. The platform 312 is extended upward (positive y direction), while the counterweight 314 is extended downward (negative y direction).

FIGS. 8 and 9, together with FIGS. 7 and 8, illustrate the capability for two-dimensional translational motion. Due to the symmetry of the construction, the platform 612 moves linearly as the flexures 604 are bent side to side (e.g., FIG. 7) and/or up and down (e.g., FIG. 9). Thus, the scanning LiDAR system 600 can provide two-dimensional scanning.

In some embodiments, movement of the platform 612 with respect to the base 608 is characterized by a first resonant frequency in a first direction or dimension (e.g., in the x, or horizontal, dimension). The movement of the platform 612 with respect to the base 608 is characterized by a second resonant frequency in a second direction or dimension (e.g., in the y, or vertical, dimension). The second direction is orthonent to the first direction.

FIG. 10 shows a first flexure 604-1 and a second flexure 604-2, each comprising four arms 624. The first flexure 604-1 comprises a first arm 624-1, a second arm 624-2, a third arm 624-3, and a fourth arm 624-4. The first arm 624-1 and the fourth arm 624-4 are coupled with the platform 612. The second arm 624-2 and the third arm 624-3 are coupled with the counterweight 614.

In some configurations, the scanning LiDAR system 600 comprises one or more lenses (e.g., an emissions lens and a receiving lens; or one lens for both emission and receiving); the second resonant frequency is designed to differ from the first resonant frequency so that a trajectory of the platform 612 follows a Lissajous pattern.

FIG. 11 illustrates a flowchart of an embodiment of a process 1100 for scanning using a LiDAR sensor with a double-sided flexure. Process 1100 begins in step 1104 with translating an optical platform relative to a lens in a plane perpendicular to an optical axis of the lens using a double-sided flexure system (e.g., flexures 604 in FIG. 6). A laser is mounted on the optical platform (e.g., platform 612 in FIG. 6).

The double-sided flexure system comprises a first flexure that extends from a first mounting location to the platform (e.g., as shown in FIG. 4). The platform comprises a first side and a second side. The second side is opposite the first side. A first flexure is fixedly coupled with a base at the first mounting location. The first mounting location is closer to the first side of the platform than the second side. A second flexure extends from a second mounting location to the platform. The second flexure is fixedly coupled with the base at the second mounting location. The second mounting location is closer to the second side of the platform than the first side.

In step 1108, light is emitted from the laser mounted to the optical platform, while translating the platform. Emitted light from the laser is transmitted through the lens and into an environment (e.g., as shown in FIGS. 1 and 2), step 1112. Light from the laser is detected, using a detector, after transmitting the light emitted from the laser into the environment, step 1116. In step 1120, a distance to an object in the environment is calculated based on detecting the light from the laser.

In some embodiments, the laser is translated in a focal plane of the lens; the lens is rigidly coupled with the base; the first flexure and the second flexure suspend the platform over the base, so that the base is below the platform; the laser is translated in a first direction at a first resonant frequency; the laser is translated in a second direction at a second resonant frequency; and/or the second direction is orthogonal to the first direction.

II. Folded Flexure

Figure 12:
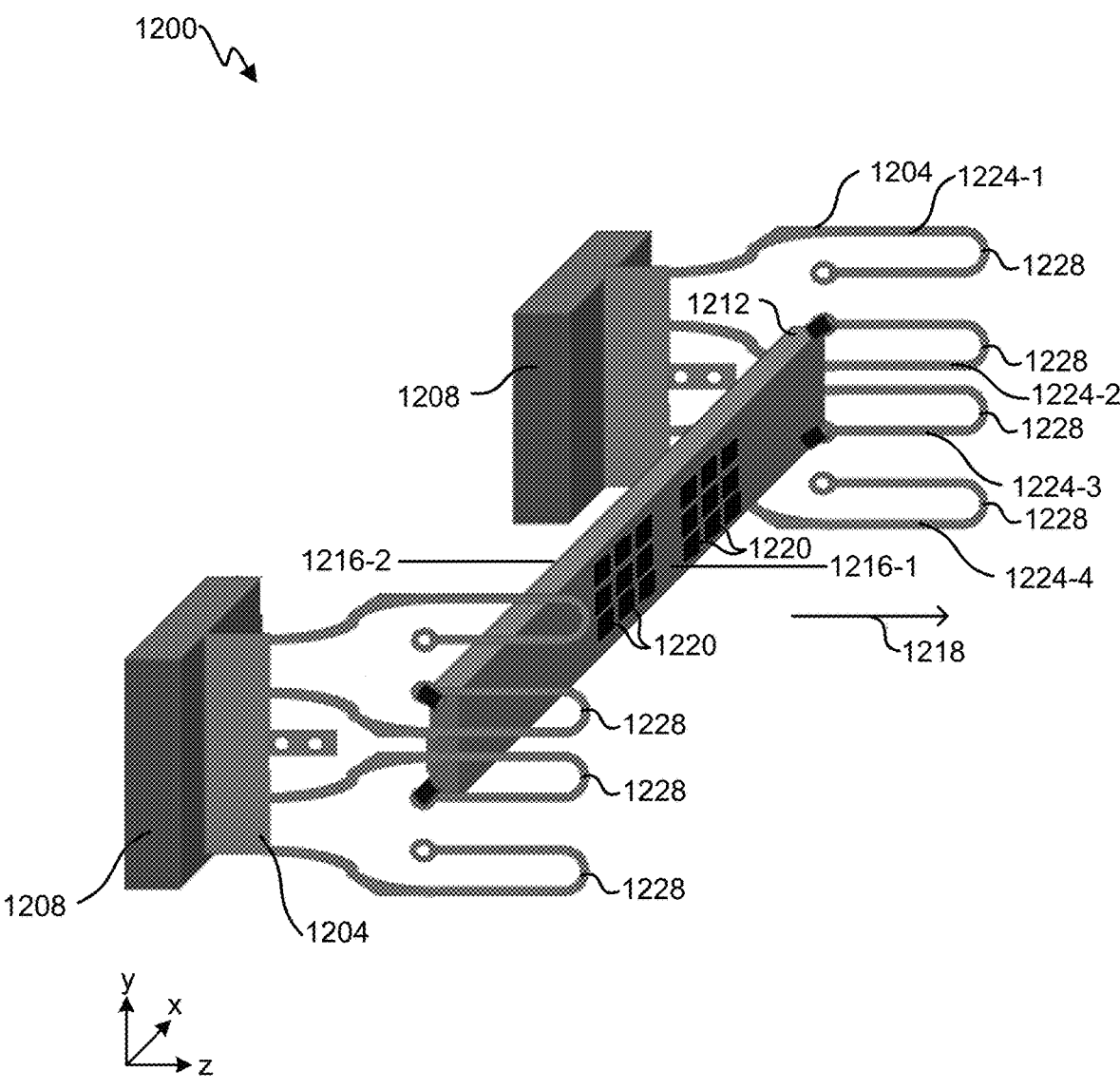
FIG. 12 depicts a perspective view of an embodiment of a scanning LiDAR system with folded flexures.

FIG. 12 depicts a perspective view of an embodiment of a scanning LiDAR system 1200 with flexures 1204 that are folded. The flexures 1204 couple a base 1208 with a platform 1212. The flexure 1204 has a folded geometry (e.g., a bend or curve). The flexure 1204 provides a substantially linear motion of the platform 1212 by folding an end of the flexure back towards the base 1208.

The platform 1212 comprises a first side 1216-1 and a second side 1216-2 opposite the first side 1216-1. The base 1208 is closer to the second side 1216-2 than the first side 1216-1. A forward direction 1218 is in a direction of an outward-pointing normal of the first side 1216-1. A backward direction is opposite the forward direction 1218.

An optical component 1220 is mounted on the platform 1212 (e.g., to the first side 1216-1 of the platform 1212). For example, a laser is mounted on the platform 1212 and arranged to transmit light into an environment and/or a detector is mounted to the platform 1212. In some embodiments, multiple optical components 1220 are mounted to the platform 1212 (e.g., multiple lasers and/or multiple detectors). One or more detectors can be arranged to detect light from one or more lasers after light is transmitted from the one or more lasers. Distances to objects, and/or parts of objects, in the environment can be calculated based on detecting the light from the one or more lasers.

A lens (not shown) of the scanning LiDAR system 1200 is characterized by a focal plane. The lens can be a simple lens or comprise a plurality of lens elements. The flexure 1204 couples the platform 1212 with the base 1208. The flexure 1204 is arranged to that the optical component 1220 is positioned at the focal plane of the lens.

The flexure 1204 comprises one, two, three, four, or more arms 1224. FIG. 12 depicts a flexure 1204 comprising a first arm 1224-1, a second arm 1224-2, a third arm 1224-3, and a fourth arm 1224-4. The second arm 1224-2 and the third arm 1224-3 couple the platform 1212 with the base 1208. The first arm 1224-1 and the fourth arm 1224-4 are arranged to couple a counterweight (not shown) with the base 1208. The counterweight is arranged to move opposite of the platform 1212 during operation.

The second arm 1224-2 (and the third arm 1224-3) extends in the forward direction 1218 from the platform 1212 to a fold 1228 in the second arm 1224-2. The fold 1228 is a forward most part of the flexure 1204. The fold 1228 is part of a physical path between the base 1208 and the platform 1212 or the counterweight. The fold 1228 in the arm 1224 extends in a backward direction from the fold 1228 toward the base 1208.

As the platform 1212 translates, a section of the arm 1224 extending from the base 1208 to the fold 1228 tends to move in a first arc that curves about a point backward of the platform 1212, while a section of the arm 1224 from the fold 1228 to the platform 1212 will move in a second arc with opposite curvature of the first arc. A combined resulting motion at an end of the arm 1224 coupled with the platform 1212 or the counterweight will be substantially in a straight line (e.g., if a length of the flexure from the base 1208 to the fold 1228 is about twice as long as a length from the fold 1228 to the platform 1212). A geometrical length relationship may depend on factors such as tapering of the flexure 1204, thickness of the flexure 1204, and/or stiffness of a connection of the flexure 1204 with the base 1208 and/or with the platform 1212. In some embodiments, a distance from the base 1208 to the fold 1228 is equal to or greater than 1.25, 1.5, 1.75, 2, 2.25, 2.5, or 3 times a distance from the platform 1212 to the fold 1228. In some embodiments, the distance from the base 1208 to the fold 1228 is equal to or less than 6, 5, 4, 3, 2.5, 2.25, or 2 times a distance from the platform 1212 to the fold 1228. In some embodiments, the optical component 1220 is arranged to be halfway between the base 1208 and the fold 1228. The flexure 1204 can be used for one- or two-dimensional scanning (e.g., in the x/y plane).

Alternative geometrical arrangements, such as having the flexure 1204 extend from the platform 1212 in the vertical direction, are also envisioned. For example, the platform 1212 can comprise a third side between the first side 1216-1 and the second side 1216-2, and optical component(s) 1220 are mounted to the third side of the platform (e.g., the base 1208 is horizontal instead of vertical). In some embodiments, the flexure 1204 is made from a planar piece of material, and the fold 1228 is in the plane of the planar piece of material.

The optical component(s) 1220 can be mounted on the first side 1216-1 or the second side 1216-2 of the platform 1212 (e.g., the lens of the system can be in either the forward or backward direction. The fold 1228 is a curvature of the flexure 1204. For example, the fold 1228 is smooth flowing without sharp turns. The fold 1228 is a bend of 180 degrees. In some embodiments the fold 1228 is a bend equal to or greater than 150, 160, 170, 175, or 180 degrees and/or equal to or less than 210, 200, 190, 185, or 180 degrees. In some configurations that deviate from 180 degrees, there can be undesirable motions or harmonics, and the flexures can take up more space.

FIG. 13 illustrates a flowchart of an embodiment of a process 1300 for scanning using a LiDAR sensor with a folded flexure. Process 1300 begins in step 1304 with translating an optical platform relative to a lens in a plane perpendicular to an optical axis of the lens using a folded flexure system (e.g., flexures 1204 in FIG. 12). A laser is mounted on the optical platform (e.g., on platform 1212 in FIG. 12).

A laser is mounted on the platform. The platform has a first side and a second side opposite the first side. The platform is coupled to a base using a flexure (e.g., FIG. 12). The flexure is arranged so that the base is closer to the second surface than the first surface. The flexure extends forward of first surface to a fold in the flexure. The flexure extends backward from the fold to the base.

In step 1308, light is emitted from the laser mounted to the optical platform, while translating the platform. Emitted light from the laser is transmitted through the lens and into an environment (e.g., as shown in FIGS. 1 and 2), step 1312. Light from the laser is detected, using a detector, after transmitting the light emitted from the laser into the environment, step 1316. In step 1320, a distance to an object in the environment is calculated based on detecting the light from the laser.

In some embodiments, the laser is translated in a focal plane of the lens; the lens is rigidly coupled with the base; the laser is translated in a first direction at a first resonant frequency; the laser is translated in a second direction at a second resonant frequency; and/or the second direction is orthogonal to the first direction.

In some embodiments, the laser is mounted on the first side of the platform, the second side of the platform, or on a third side of the platform, wherein the third side is between the first side and the second side. The method can comprise translating a counterweight in opposition to motion of the platform.

III. Pivot Mount for Rotational, Reciprocating Scanning

FIG. 14 depicts a top view of an embodiment of a scanning LiDAR system 1400 with a pivot mount 1404 that is fixed. The scanning LiDAR system 1400 comprises a base and a lens 1408 coupled (e.g., fixedly coupled) with the base. The lens 1408 is a collimating lens. In FIG. 14, a rotation motion, rather than a linear-translation motion, is used for scanning.

The scanning LiDAR system 1400 comprises a platform 1412, a counterweight 1414, a first bar 1416-1, a second bar 1416-2, a third bar 1416-3, and a fourth bar 1416-4. The first bar 1416-1 and the second bar 1416-2 couple the platform 1412 with the pivot mount 1404 (e.g., the first bar 1416-1 and the second bar 1416-2 are coupled to the platform 1412, and the first bar 1416-1 and the second bar 1416-2 are coupled to the pivot mount 1404). The third bar 1416-3 and the fourth bar 1416-4 couple the counterweight 1414 with the pivot mount 1404 (e.g., the third bar 1416-3 and the fourth bar 1416-4 are coupled to the platform 1412, and the third bar 1416-3 and the fourth bar 1416-4 are coupled to the pivot mount 1404). The counterweight 1414 can be added to reduce or cancel rotational momentum from the scanning of the platform 1412.

The bar 1416 is an elongate structure configured to bend while the platform 1412 (or counterweight 1414) is in motion during scanning. For example, the bar 1416 is configured to deflect during scanning based on a mass of the platform 1412. The bar 1416 can be metal, plastic, silicon, or other suitable material. The bar 1416 can be referred to as a flexure (e.g., because it is designed to flex during operation based on the mass of the platform 1412 or the mass of the counterweight 1414, to enable scanning). The bar 1416 can be a rod (e.g., an elongate rod).

One or more optical components 1420 are mounted on the platform 1412. In some embodiments the optical component 1420 is a laser or detector. For example, a plurality lasers are mounted on the platform 1412 and arranged to transmit light into an environment through the lens 1408; and/or a plurality of detectors are mounted on the platform 1412 and arranged to detect light from the plurality of lasers after light is transmitted from the plurality of lasers into the environment (e.g., detectors receive light passing from the environment through the lens 1408 or through a second, receiving lens).

The platform 1412 is arranged to rotate about the pivot mount 1404 during scanning. Scanning causes a part of the environment (e.g., objects, surfaces) to be traversed by light (e.g., by light pulses) from a laser and/or traversed by a detector The counterweight 1414 is arranged to rotate about the pivot mount 1404 during scanning (e.g., in an opposite direction as the platform 1412). One or more memory devices comprise instructions that, when executed, calculate a distance to an object in the environment based on detecting the light from the laser(s).

The platform 1412 is curved, having an arc shape. The pivot mount 1404 is approximately at a center of the arc formed by the curve of the platform 1412. This design allows the platform 1412 to scan in a one-dimensional rotational fashion about the pivot point as shown by the double-headed arrow. Two-dimensional scanning is possible by having the bars 1416 additionally bend in the direction into and out of the page (e.g., the y dimension). The curve of the platform 1412 is designed to match a field curvature of the lens 1408 (e.g., like the retina in a human eye). This allows for a much simpler lens design, which could be a single lens element instead of a more common and complex compound lens design. Scanning of the scanning LiDAR system 1400 uses a rotational, reciprocating motion about a fixed pivot mount 1404 that is approximately at the optical center of the lens 1408. In some embodiments, a plurality of lasers are mounted on the platform 1412 along a curve of the platform 1412. In some embodiments, the platform 1412 is flat, and lasers are mounted along a curve using one or more interposers. U.S. patent application Ser. No. 16/282,366, filed on Mar. 24, 2020, and incorporated by reference for all purposes, provides examples of interposers mounting optical components in a curve on a platform. The counterweight 1414 is curved (e.g., and the curve of the counterweight 1414 has a larger radius curvature than the curve of the platform 1412, and/or a center of curvature of the counterweight 1414 is collocated with a center of curvature of the platform 1412). Though the platform 1412 and the counterweight 1414 are shown as curved, other shapes are possible. For example, the platform 1412 and/or the counterweight 1414 can have flat segments joined at angles, or the counterweight 1414 could comprise two rectangular weights with one weight above the platform 1412 (out of the page) and the other underneath.

FIG. 15 depicts a top view of an embodiment of a scanning LiDAR system 1500 with a rotating pivot mount. The scanning LiDAR system 1500 comprises a pivot mount 1504, a base, and a lens 1508 coupled (e.g., fixedly coupled) with the base. In FIG. 15, a rotation motion, rather than a linear-translation motion, is used for scanning.

The scanning LiDAR system 1500 comprises a platform 1512, a counterweight 1514, a first bar 1516-1, a second bar 1516-2, a third bar 1516-3, and a fourth bar 1516-4. The first bar 1516-1 and the second bar 1516-2 couple the platform 1512 with the pivot mount 1504 (e.g., the first bar 1516-1 and the second bar 1516-2 are coupled to the platform 1512, and the first bar 1516-1 and the second bar 1516-2 are coupled to the pivot mount 1504). The third bar 1516-3 and the fourth bar 1516-4 couple the counterweight 1514 with the pivot mount 1504 (e.g., the third bar 1516-3 and the fourth bar 1516-4 are coupled to the platform 1512, and the third bar 1516-3 and the fourth bar 1516-4 are coupled to the pivot mount 1504).

The scanning LiDAR system 1500 is similar to the scanning LiDAR system 1400 in FIG. 14, except the bars 1516 are rigid and the pivot mount 1504 rotates (e.g., pivots or flexes). In some embodiments the pivot mount 1504 comprises a sliding bearing, a flexure bearing, and/or a flexure element (e.g., a torsion bar).

Figure 16:
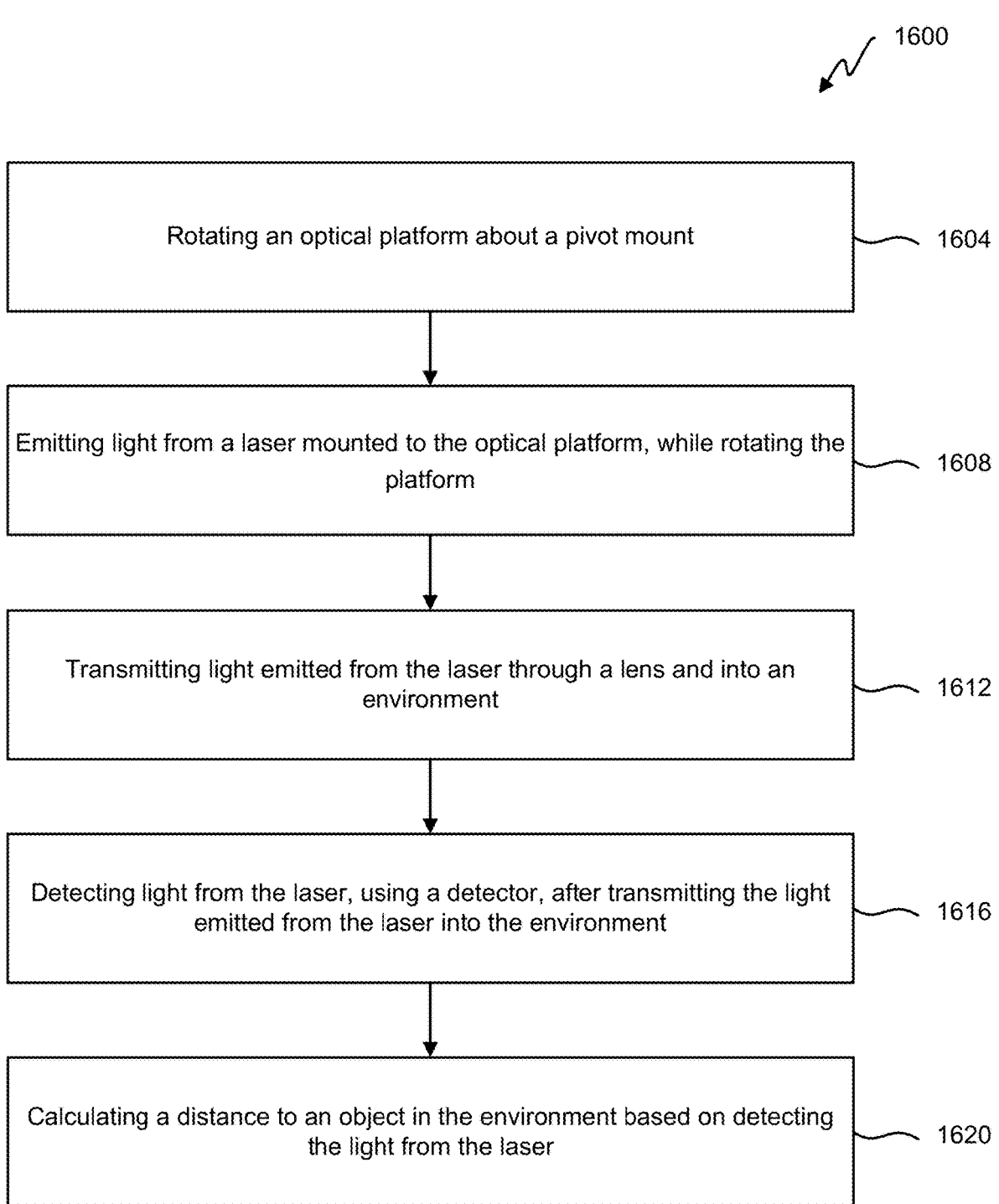
FIG. 16 illustrates a flowchart of an embodiment of a process for scanning using a LiDAR sensor with pivot mount.

FIG. 16 illustrates a flowchart of an embodiment of a process 1600 for scanning using a LiDAR sensor with pivot mount. Process 1600 begins in step 1604 with rotating an optical platform about a pivot mount. A laser is mounted on the platform. The pivot mount is coupled with a base. A lens is fixedly coupled with the base. A first bar and a second bar couple the platform with the pivot mount. For example, the platform 1412 in FIG. 14 is rotated about pivot mount 1404, or the platform 1512 in FIG. 15 is rotated about pivot mount 1504.

In step 1608, light is emitted from a laser mounted to the optical platform, while rotating the platform. Emitted light from the laser is transmitted through a lens (e.g., lens 1408 in FIG. 14 or lens 1508 in FIG. 15) and into an environment, step 1612. Light from the laser is detected, using a detector, after transmitting the light emitted from the laser into the environment, step 1616. For example, the detector is mounted on platform 1412 in FIG. 14 or platform 1512 in FIG. 15. Light emitted from the laser is reflected by an object in the environment and passes back through lens 1408 or 1508 and to the detector. In step 1620, a distance to the object in the environment is calculated based on detecting the light from the laser.

In some embodiments, the first bar and the second bar are arranged to flex, and the pivot mount is fixed while scanning (e.g., FIG. 14). The first bar and the second bar can be configured to flex in two dimensions for two-dimensional scanning of the laser. In some embodiments, the first bar and the second bar are rigid, and the pivot mount rotates (e.g., FIG. 15).

In some embodiments, the laser is rotated in a focal plane of the lens; the lens is rigidly coupled with the base; the laser is rotated in a first direction at a first resonant frequency; the laser is rotated in a second direction at a second resonant frequency; and/or the second direction is orthogonal to the first direction. In some embodiments, rods are stiff for rotation in one direction (e.g., rotation in the x/z plane about the pivot mount 1504 in FIG. 15) and flex in a second direction (e.g., into and out of the page in FIG. and 15). For example, the bar 1516 in FIG. 15 can be thick in the x/z plane and thin in they dimension (e.g., the bar 1516 has a width that is equal to or greater than twice the height of the bar 1516 and/or equal to or less than ten times the height of the bar 1516, wherein width is measured in the x dimension while the bar 1516 is parallel to the z dimension, and height is measured in they dimension).

The method can comprise rotating a counterweight (e.g., counterweight 1414 in FIG. 14 or counterweight 1514 in FIG. 15) in opposition to motion of the platform.

In some embodiments, the laser is one of a plurality of lasers mounted on the platform along a curve. For example, the platform is curved; the platform is straight, and the plurality of lasers are mounted along the curve using one or more interposers; or the platform has a first curvature, and the plurality of lasers are mounted along a second curvature using one or more interposers, wherein the second curvature has a shorter radius of curvature than the first curvature.

The pivot mount 1404 has a width (e.g., measured in the x dimension) that is less than a width of the platform 1412 (e.g., measured in the x dimension while the platform 1412 is in a neutral position). In some embodiments, the width of the pivot mount 1404 is equal to or less than $\frac{3}{4}$, $\frac{1}{2}$, $\frac{1}{4}$, $\frac{1}{6}$, or $\frac{1}{8}$ the width of the platform 1412 and/or equal to or greater than $\frac{1}{20}$, $\frac{1}{15}$, $\frac{1}{12}$, or $\frac{1}{10}$ of the width of the platform 1412.

Various features described herein, e.g., methods, apparatus, computer-readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for scanning LiDAR, the system comprising:
a base;
a lens fixedly coupled with the base;
a platform;
a laser mounted on the platform, the laser arranged to transmit light into an environment through the lens;
a pivot mount coupling with base;
a first bar and a second bar coupling the platform with the pivot mount, wherein the platform is arranged to rotate about the pivot mount during scanning,
a detector arranged to detect light from the laser after light is transmitted from the laser into the environment; and
one or more memory devices comprising instructions that, when executed, calculate a distance to an object in the environment based on detecting the light from the laser.

2. The system of claim 1, wherein the detector is on the platform.

3. The system of claim 1, wherein the detector is one of a plurality of detectors.

4. The system of claim 1, wherein the lens is a single-element lens.

5. The system of claim 1, further comprising a counterweight, wherein the counterweight is curved.

6. The system of claim 1, wherein the pivot mount comprises a sliding bearing, a flexure bearing, or a torsion bar.

7. A system for scanning LiDAR, the system comprising:
a base;
a platform;

an optical component mounted on the platform;
a pivot mount coupled with the base; and
a first bar and a second bar coupling the platform with the pivot mount, wherein the platform is arranged to rotate about the pivot mount, wherein:
the optical component is a laser;
the laser is part of a plurality of lasers;
the system comprises a lens fixedly coupled with the base;
the laser is arranged to transmit light into an environment through the lens;
the system comprises a detector arranged to detect light from the laser after light is transmitted from the laser into the environment; and
the system comprises one or more memory devices comprising instructions that, when executed, calculate a distance to an object in the environment based on detecting the light from the laser.

8. The system of claim 7, wherein the plurality of lasers are mounted on the platform along a curve.

9. The system of claim 8, wherein the curve matches a field curvature of the lens.

10. The system of claim 8, the pivot mount is at a center of the curve.

11. The system of claim 8, wherein the platform is curved.

12. The system of claim 8, wherein:
the platform is straight; and
the plurality of lasers are mounted on one or more interposers.

13. The system of claim 7, wherein the first bar and the second bar are arranged to flex, and the pivot mount is fixed while scanning.

14. The system of claim 8, wherein:
the first bar and the second bar are rigid; and
the pivot mount is arranged to rotate during scanning.

15. The system of claim 8, wherein the first bar and the second bar are arranged to flex in two dimensions during scanning.

16. A method for scanning LiDAR, the method comprising:
rotating a platform about a pivot mount, wherein:
a laser is mounted on the platform;
the pivot mount is coupled with a base;
a lens is fixedly coupled with the base; and
a first bar and a second bar couple the platform with the pivot mount;
emitting light from the laser while rotating the platform;
transmitting light emitted from the laser through the lens and into an environment;
detecting light from the laser, using a detector, after transmitting the light emitted from the laser into the environment; and
calculating a distance to an object in the environment based on detecting the light from the laser.

17. The method of claim 16, wherein:
the first bar and the second bar are arranged to flex during scanning; and
the pivot mount is fixed during scanning.

18. The method of claim 16, wherein the first bar and the second bar are arranged to flex in two dimensions during scanning.

19. The method of claim 16, wherein the detector is on the platform.

20. The system of claim 7, further comprising a curved counterweight.

* * * * *